H. HEMPEL.
CONE WAFFLE MACHINE.
APPLICATION FILED NOV. 13, 1916.

1,300,390.

Patented Apr. 15, 1919.
6 SHEETS—SHEET 1.

Fig. 1.

WITNESSES:

INVENTOR
Henry Hempel
BY
ATTORNEY

Fig.3.

WITNESSES:

INVENTOR
Henry Hempel
By George F. Thorpe
ATTORNEY

H. HEMPEL.
CONE WAFFLE MACHINE.
APPLICATION FILED NOV. 13, 1916.

1,300,390.

Patented Apr. 15, 1919.
6 SHEETS—SHEET 5.

WITNESSES:

INVENTOR
Henry Hempel
BY
ATTORNEY

UNITED STATES PATENT OFFICE.

HENRY HEMPEL, OF GAGE, OKLAHOMA, ASSIGNOR OF TWO-THIRDS TO ABRAHAM S. BATRICK, OF KANSAS CITY, MISSOURI.

CONE-WAFFLE MACHINE.

1,300,390.     Specification of Letters Patent.     Patented Apr. 15, 1919.

Substitute for application Serial No. 809,385, filed December 29, 1913. This application filed November 13, 1916. Serial No 131,338.

*To all whom it may concern:*

Be it known that I, HENRY HEMPEL, a citizen of the United States, residing at Gage, in the county of Ellis and State of Oklahoma, have invented certain new and useful Improvements in Cone-Waffle Machines, of which the following is a specification.

This invention relates to machinery for use in the manufacture of cone waffles and my object is to produce a machine for efficiently carrying on the manufacture of these articles on a large scale.

To this end the invention comprises an oven of suitable size through which is driven a conveyer carrying cone molds of a peculiar construction hereinafter described, into which molds is automatically fed the waffle dough just as they are entering the oven. Within the oven is provided a second conveyer carrying dies for coöperating with the molds to impart a hollow cone shape to the waffles. After the waffles have been baked the same are automatically ejected from the molds while the latter are returning to dough-receiving position.

With this general object in view the invention consists in certain novel and peculiar features of construction and organization as hereinafter described and pointed out in the appended claims, and in order that it may be fully understood reference is to be had to the accompanying drawings, in which:

Figure 2:
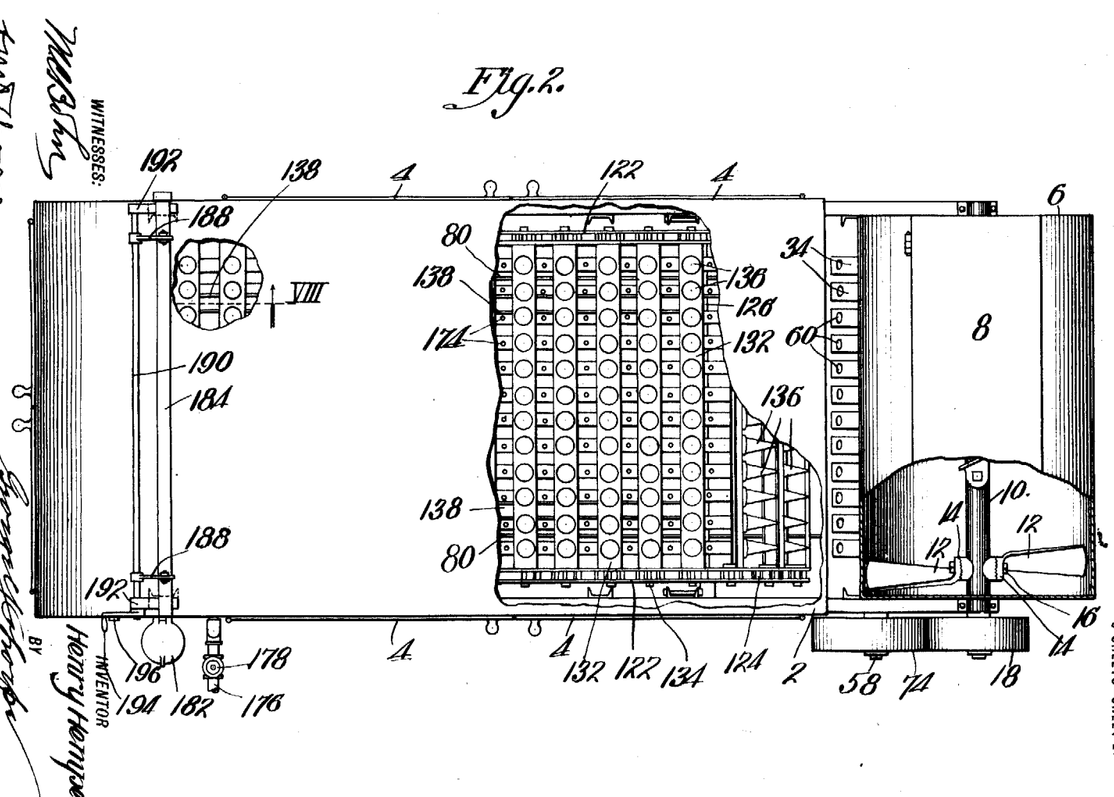
Fig. 2, is a plan view of the same also partly broken away.

Referring to the drawings, an oven 2 is provided of any desired dimensions according to the capacity required, the same being constructed of sheating supported by suitable framework as shown, and provided at each side with a pair of doors 4. Mounted at one end of the oven is a dough reservoir 6 having a hinged cover 8. Within this reservoir is journaled a shaft 10 for carrying a dough stirring reel comprising blades 12 (see Fig. 2), these blades having rosette clamping head 14 whereby the blades may be adjusted about the axes of clamping bolts 16, to regulate the angle of the blades. There are preferably four sets of these blades which are so adjusted that the blades in each half of the reservoir will stir the dough toward each other. The reservoir can be partitioned if desired, and a slightly different dough, for example a sweeter dough, used in one-half of the reservoir from what is contained in the other half, and each batch of dough will be effectively stirred by two of the sets of blades. The shaft 10 is provided with a suitable belt pulley 18.

Figure 5:
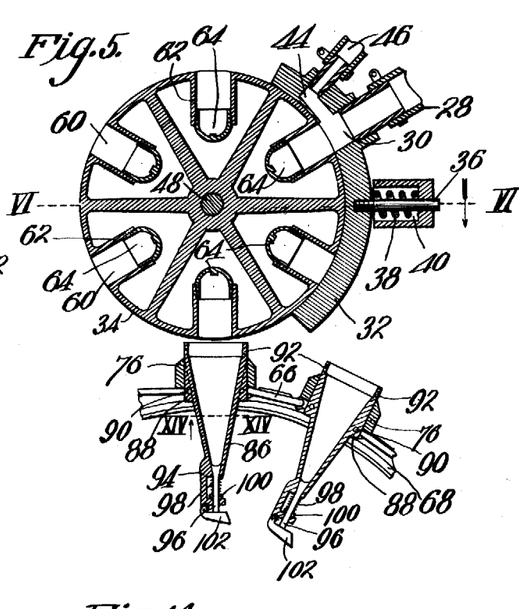
Fig. 5, is a vertical sectional view through the dough feeding wheel, and the adjacent portion of the mold conveyer.
Figure 6:
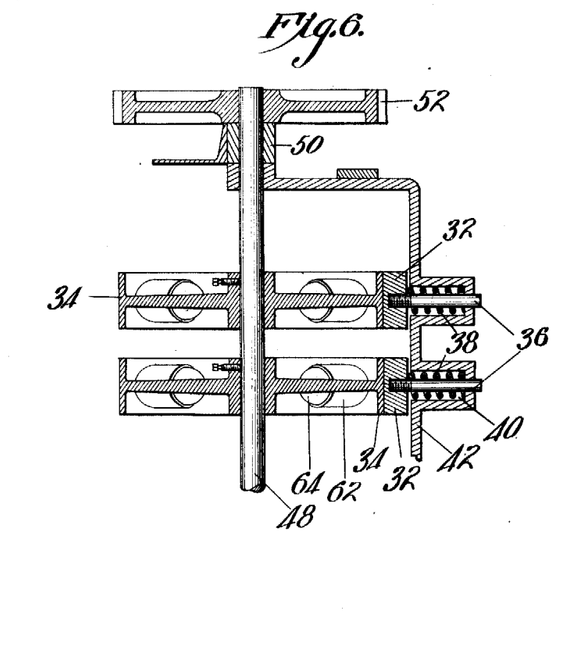
Fig. 6, is a horizontal section on the line VI—VI of Fig. 5.
Figure 7:
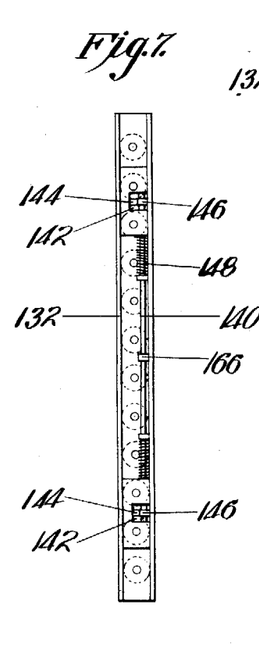
Fig. 7, is a plan view of one of the die-carrying bars, further illustrating the locking or clamping mechanism shown in Fig. 4.

For taking the dough from the reservoir 6 a series of discharge ports is provided, each controlled by a valve 26, it being understood that the dough is of a flowing consistency. From each valve is a lead pipe 28 communicating at its lower end with an opening 30 in a guard member 32 arranged opposite one side of the dough feeding wheel 34, there being as many of the pipes 28, guards 32 and wheels 34 as there are rows of molds in the conveyer to be fed, twelve of such rows being illustrated (see Fig. 2). Each guard member is provided with a pin 36 (see Fig. 5), about which is coiled a spring 38 in a socket 40 in the cross bar 42 carried by the oven frame. By means of this spring the guard member is held snugly against the periphery of the feeding wheel. A by-pass 44 for air is provided in the guard member adjacent the opening 30, and is connected by a tube 46 leading back to the upper portion of the reservoir.

The dough-feeding wheels are carried by a shaft 48, journaled in brackets 50, and driven by means of a gear 52 meshing with a gear 56 mounted on the front shaft 58 of the mold conveyer. Each wheel is formed with a plurality of feed cup openings 60 (in the present instance six in number) adapted to register with the openings 30, and each feed cup comprises an inwardly projecting tube 62 into the inner end of which is screwed an approximately hemispherical shell 64 forming the bottom of the cup. By means of this adjustable bottom it will be apparent that the capacity of the cup may be slightly varied. The dough is fed into the cups as they register with the opening 30, the air leaving the cups by way of the by-pass 44, and the guard 32 serves to retain the dough in the cups as they are rotated by the wheel into inverted position at the lower end of the guard where the dough is allowed to be discharged into a series of molds carried by a mold carrier now to be described.

The mold conveyer comprises a pair of sprocket chains 66 operated around sprocket wheels 68 on a shaft 58 at the front of the oven and around sprocket wheels 70 on shaft 72 at the rear. The shaft 58 carries a pulley 74 for driving the conveyer. Connecting the chains 66 is a series of cross bars 76 which swivel upon pins 78 carried by said chains.

Tracks 80 are carried by the oven frame for engaging the cross bars and supporting them during their upper run and maintaining the same from sagging, while curved tracks 82 are positioned to engage said cross bars in passing around the sprocket wheels and straight tracks 84 and 85 engage both sides of the cross bars to steady the conveyer throughout its lower run.

Figure 1:
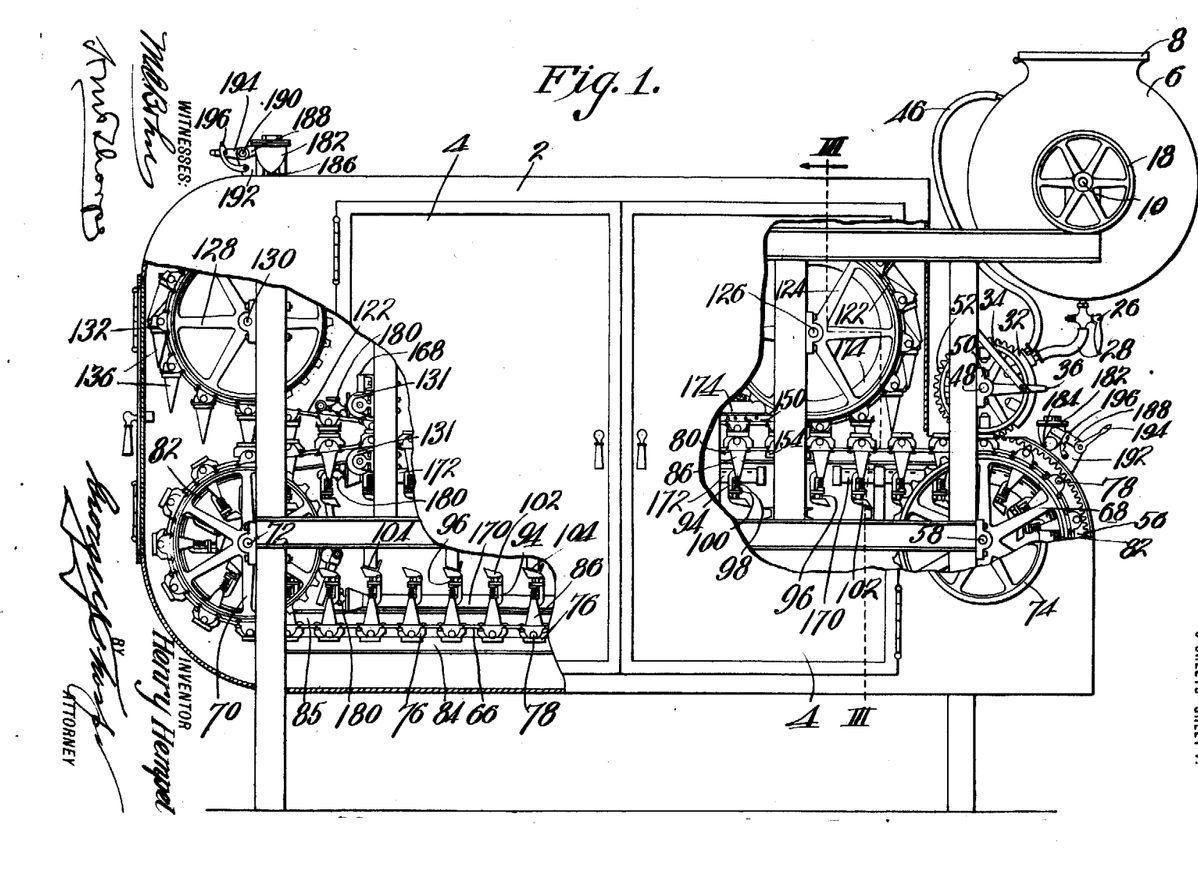
Figure 1 is a side elevation, partly broken away, of a machine embodying my invention.
Figure 4:
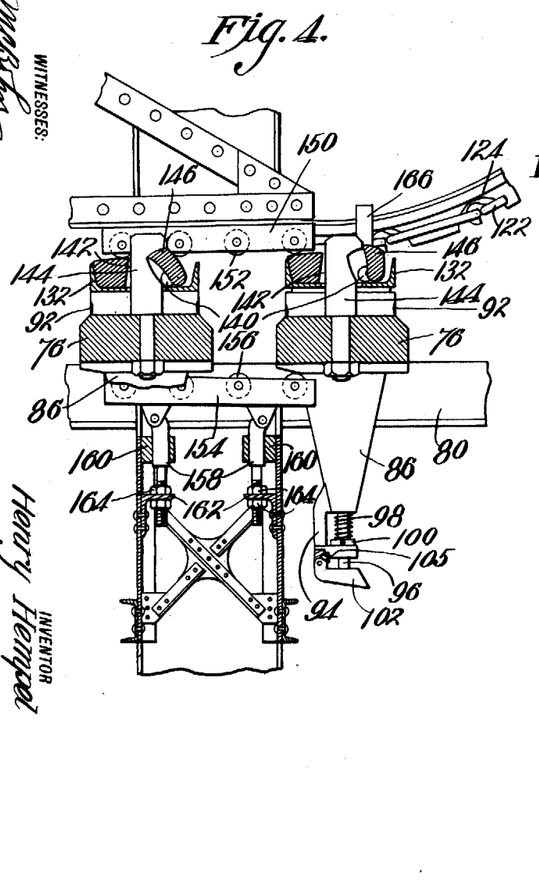
Fig. 4, is a sectional detail view of a certain clamping mechanism hereinafter described.

Each cross bar 76 has a longitudinal series of openings to receive the molds 86 which serve during the travel of the conveyer beneath the feed wheel to receive dough therefrom. These molds are conical in form (see Figs. 4 and 5), and are provided with perforated lugs 88 fitted with cotters 90 engaging the cross bars to hold the molds in place. The molds are provided near their upper edges with vents 92 for a purpose hereinafter explained. Each mold also has a bracket extension 94 at its smaller end for carrying a plunger 96, the head of which operates within the small end of the mold, being held normally retracted by a coil spring 98 bearing at its opposite ends against the mold and a nut 100 on the plunger. The extension 94 also has pivoted thereto a dog 102 designed to engage and operate the plunger for the purpose of ejecting the cones after they are baked. For this purpose a series of cam members 104 is mounted in the path of said dogs 102 (see Fig. 1), for depressing the dogs and plungers against the action of springs 98. Each dog is provided with a stop lug 105 for limiting its pivotal movement (see Fig. 4).

Figures 9, 10, 11, 12, 13:
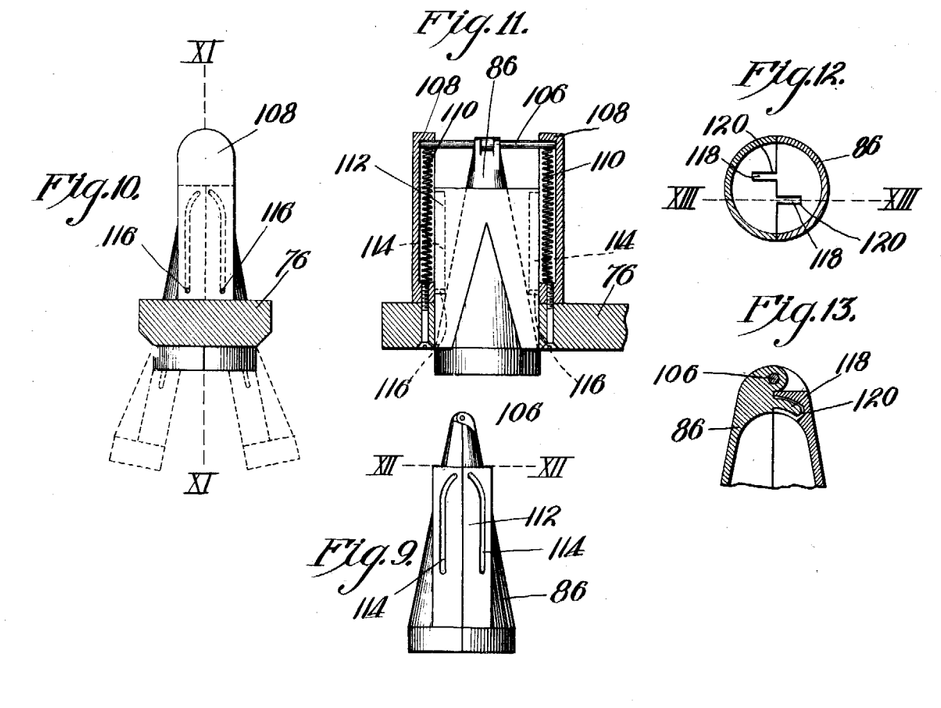
Fig. 9, is a side view of a modified form of mold.
Fig. 10, is a transverse section through one of the mold carrying cross bars with dotted lines diagraming the opening action of the split mold.
Fig. 11, is a vertical section on the line XI—XI of Fig. 10.
Fig. 12, is a section on the line XII—XII of Fig. 9.
Fig. 13, is a section on the line XIII—XIII of Fig. 12.
Figure 14:
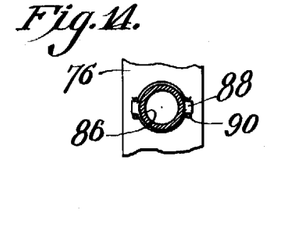
Fig. 14, is a section on the line XIV—XIV of Fig. 5.

In Figs. 9 to 13 I show a modified form of mold for use with sweetened dough for making checkered cones which are more difficult to eject because of the greater tendency to stick. In this form the mold is made in sections pivoted together by means of a pin 106 held at the outer ends of extensions 108, formed on the cross bar, by means of compression springs 110. Each section of the mold is provided with a guide lug 112 having cam grooves 114 for engagement with pins 116 carried by the cross bar, whereby as the mold is forced through the opening in the cross bar by reason of its hinged end engaging one of the cams 104, its sections will be caused to spread as indicated in Fig. 10.

As the mold is drawn back through the opening, the curved ends of the grooves 114 receiving pressure from pins 116 whereby the sections of the mold are closed together, the springs continuing the withdrawal movement of the mold in its closed position until the pivot pin 106 is arrested by the ends of the extensions 108.

For insuring the separation of a cone from the mold, ejecting fingers 118 (see Figs. 12 and 13), are formed in the bottom, one to each section, and project into recesses 120 in the other section, so that as the mold starts to spread the fingers may have a slight free movement before contact with the cone.

Above the mold carrier is located a die carrying conveyer which comprises a pair of chains 122 operating around a pair of sprockets 124 mounted on shaft 126 at the front end of the oven and around a similar pair of sprockets 128 mounted on the shaft 130 at the rear. It will be noted that the rear sprockets of both conveyers are slightly smaller than the front sprockets so that the conveyers diverge near their rear ends to gradually separate the dies from the molds, suitable guide rollers 131 being provided for the chains where they leave the horizontal.

Figure 8:
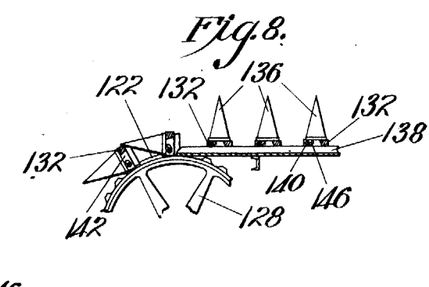
Fig. 8, is a sectional detail taken along the line VIII—VIII of Fig. 2.

Connecting the chains 122 is a series of cross bars 132 which swivel upon pins 134 carried by said chains, in the same manner as the cross bars 76 of the lower conveyer. The cross bars 76 and the cross bars 132 are spaced the same distance apart and to each of the latter is secured a row of conical dies 136 equal in number to the molds carried by each of the cross bars 76. A pair of tracks 138 are carried by the oven frame in position to support the upper run of the die conveyer by engagement with the cross bars 132, the ends of these tracks terminating adjacent the sprocket wheels so as to engage the cross bars and cause them to assume a horizontal position at the rear of the oven and thereby swing the dies into upwardly projecting vertical position (see Fig. 8). At the front of the oven the ends of the tracks permit the cross bars again to pivot freely and thereby allow the dies to swing down in position to be received in the molds just as the latter are entering the oven (see Fig. 1).

Figure 3:
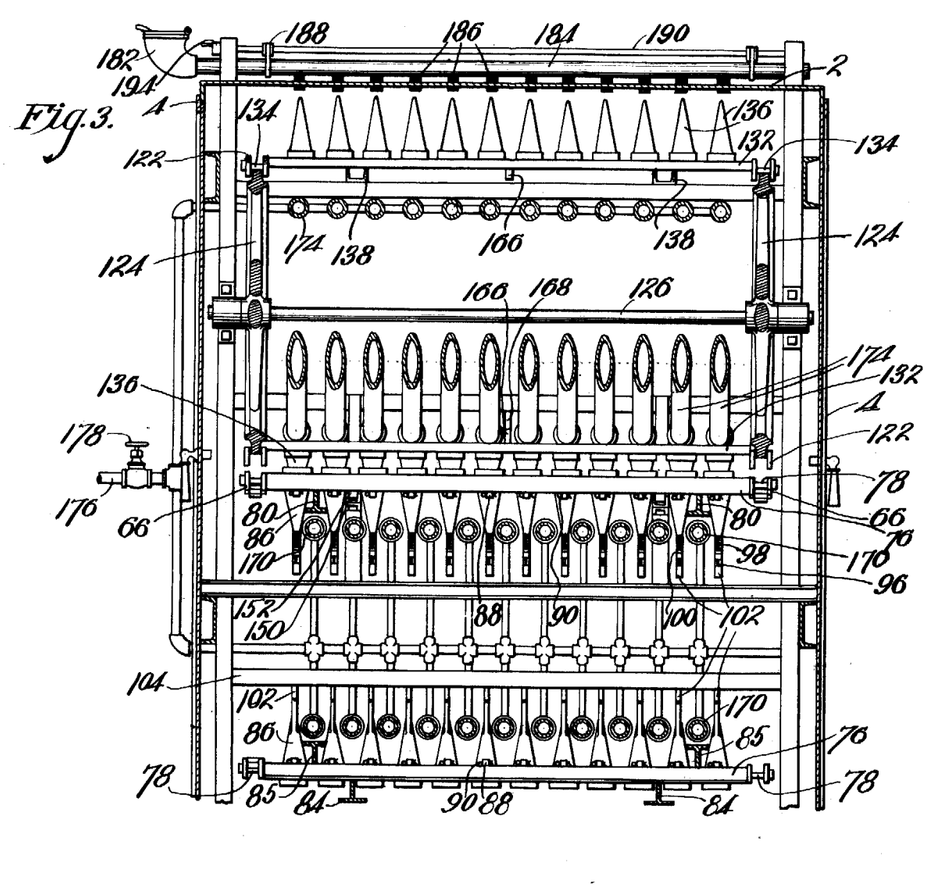
Fig. 3, is a vertical section on the line III—III of Fig. 1, certain parts in the background being omitted.

The die conveyer is driven by the dies being interlocked with the molds, and the two sets of cross bars are accordingly provided with interlocking means as follows: Each of the cross bars 132 is provided on its face opposite the dies with a pivoted latch rod 140, and near its ends with a pair of openings 142. At points corresponding to the openings 142, the cross bars 76 are provided with bolts 144 having recessed heads adapted, as the cross bars 76 and 132 come together, to pass through the openings 142 and form catches for engagement by latches 146 carried at opposite ends of the rod 140 adjacent said openings. A spring 148 actuates the rod to throw the latches automatically into locking engagement. This means serves to lock the cross bars with the molds and dies clamped tightly together, it being understood that the bolts 144 and latches 146 are employed in conjunction with the mold shown in Figs. 9 to 13, inclusive. In order to bind the parts intimately together to enable the spring 148 to properly throw the latches into engagement with the catches of bolts 144, the conveyers are passed at this point between a pair of converging roller guides consisting of longitudinally extending horizontal bars 150 carrying rollers 152, for engagement by the cross bars 132, and a pair of inclined longitudinally extending bars 154 carrying rollers 156, for engagement with the lower cross bars 76 (see Fig. 4). The bars 154 are carried pivotally at the upper ends of vertical posts 158 which are vertically adjustable through guide lugs 160 and brackets 162 by means of nuts 164 threaded on the lower ends of the posts, whereby the desired angle of incline may be secured for the bars 154. When the conveyers approach the rear end of the oven and are about to separate again, the latching means is automatically tripped by engagement of a finger 166 on the rod 140 with the tripping lug 168 located in the path of said finger (see Figs. 1 and 3).

The means for heating the oven comprises a series of gas burner pipes 170 arranged inside the mold carrier between the rows of molds and following the curvature of the front end thereof (see Figs. 1 and 3), said pipes having outwardly facing jet openings for properly directing the flames against the molds. A second set of pipes 172 is arranged between the rows of molds throughout the remainder of the upper run of said conveyer, and two sets of pipes 174 similar to the pipes 172 are also arranged inside the die conveyer and provided with outwardly facing jet openings for heating the dies. The pipes are branched from a feed pipe 176 having a valve 178 and each of the oven pipes is also provided with an individual valve 180 whereby the same may be regulated, preliminary to the starting of the oven after which the gas supply is controlled entirely by the valve 178.

For greasing the dies and molds as often as may be required, I have devised a convenient means which comprises a grease cup 182 for each conveyer which feeds grease to a pipe 184 extending transversely of the conveyer and provided with wicking 186 adapted to be brought in contact with the dies and molds when the pipe 184 is lowered. Each pipe 184 is carried by arms 188 mounted on a rock shaft 190 journaled in brackets 192 supported by the oven. Each rock shaft is equipped with a lever 194 whereby the same may be operated, and suitable latches 196 are provided to hold the arms 188 elevated into inoperative position.

In the operation of the machine the dough is kept thoroughly stirred by the action of the blades and flows through the pipes 28 into the pockets of the dough feeding wheels 34, the air being vented through the passages 44. The ratio of the diameters of the gears 52 and 56 is such that the feeding wheels are driven at the same peripheral speed as the mold carrier, and accordingly as the pockets of the feeding wheels become uncovered by the guards 32 a mold comes into position and travels beneath each of the pockets to receive the dough as it drips from the pocket. After receiving the dough the molds move into the path of the descending dies 136, one of the dies entering each of the molds and thereby forming a waffle of conical shape in the space between them. As all of the molds and dies are kept constantly at a baking temperature, the moisture in the dough is vaporized and more or less pressure is generated between the molds and dies, so that some of the dough issues through the vent 92. Because of this pressure it is also desirable to lock the two conveyers together during their horizontal travel and this is done through the automatic means described and as a result the die carrier is driven by and at an equal speed with the mold conveyer. Adjacent the rollers 131 the fingers 166 come into engagement with the tripping lugs 168 and are automatically actuated to unlock the latching means and the conveyers begin to diverge around the rear sprocket wheels. The molds travel around the lower sprocket wheels 70 and are maintained in radial position by the tracks 82 in order to invert the molds, the straight tracks 84 continuing to hold the molds inverted throughout the lower run of the mold conveyer.

The slender stems which have been formed on the waffle by pressure of the dough out of the vents 92 serve to retain the waffles in the inverted molds until the latter reach the first cam 104. The plungers 96 are then actuated by engagement of the dogs 102 with the cam 104 to break the waffle stems just referred to and eject the waffles from the molds. A series of the cams 104 is provided in order to insure the discharge of the waffles, which are allowed to fall through an opening in the bottom of the oven and may be conveyed away in any suitable manner. The molds then follow the course of the conveyer around to dough-receiving position and the subsequent operations of the machine are a mere repetition of that outlined above.

In case, however, it is preferred to use a sweeter dough and especially if checkered waffles are to be made the modified form of mold shown in Figs. 9 to 13 will be used to facilitate the discharge of the waffles. In this form the cam 104 caused the mold itself to slide down through the cross bar and the mold sections are caused to spread by reason of the pins 116 following the grooves 114 and the waffle is ejected by the action of the fingers 118.

From the foregoing it will be apparent that I have produced a machine for making cone waffles embodying the features of advantage enumerated as desirable and while I have illustrated two forms which my invention may take, I wish it to be understood that I do not desire to be restricted to the exact details of construction shown and described but reserve the right to make all changes falling within the spirit and scope of the appended claims.

I claim:

1. In a cone waffle machine, a bake oven, a driven endless conveyer extending through said oven, molds carried by the conveyer, a dough reservoir adjacent one end of the oven, a dough feeding means above and rotating at the same speed and into successive alinement with said molds for discharging dough therein, a guard to retain the dough in the feeding means until the latter is positioned to discharge into a mold, and a plurality of devices for travel in said oven and respectively coöperating with said molds to shape and hold the dough in hollow form while within the oven.

2. In a cone waffle machine, a bake oven, an endless conveyer traveling through said oven and carrying a plurality of rows of molding devices, means for feeding dough to said molding devices, means coöperating successively with the molding devices of the several rows to shape the dough into cone waffle form, a grease distributing pipe, and wicks depending from said pipe for simultaneously greasing said rows of devices.

3. In a cone waffle machine, a bake oven, an endless conveyer traveling through said oven and carrying a plurality of rows of molds, means for feeding dough to said molds, an endless conveyer carrying a plurality of rows of devices for coöperating with said molds to shape the dough into cone waffle form, a grease supply cup, a distributing pipe extending transversely therefrom, and wicks depending from said pipe for simultaneously greasing said rows of devices.

4. In a cone waffle machine, a bake oven, a pair of endless conveyers operating within said oven about horizontal axes one above the other and each having a series of cross bars, the cross bars of the lower conveyer carrying a plurality of rows of molds and the cross bars of the upper conveyer having openings and carrying a plurality of rows of die members coöperating with said molds during the upper run of the mold conveyer to shape the dough into cone waffle form, means for driving one of said conveyers, notched heads projecting from the cross bars of the lower conveyer and adapted to be projected through the said openings of the bars of the upper conveyer, and a spring-actuated latch bar carried by each cross bar of the upper conveyer and provided with latches to engage said notched heads and lock the bars together.

5. In a cone waffle machine, a bake oven, a pair of endless conveyers operating within said oven about horizontal axes one above the other and each having a series of cross bars, the cross bars of the lower conveyer carrying a plurality of rows of molds and the cross bars of the upper conveyer having openings and carrying a plurality of rows of die members coöperating with said molds during the upper run of the mold conveyer to shape the dough into cone waffle form, means for driving one of said conveyers, notched heads projecting from the cross bars of the lower conveyer and adapted to be projected through the said openings of the bars of the upper conveyer, a spring-actuated latch bar carried by said cross bar of the upper conveyer and provided with latches to engage said notched heads and lock the bars together, and converging means for clamping the bars firmly together without interfering with the movement of the conveyers, to insure proper locking movement by the latch bar.

6. In a cone waffle machine, a bake oven, a pair of endless conveyers operating within said oven about horizontal axes one above the other and each having a series of cross bars, the cross bars of the lower conveyer carrying a plurality of rows of molds and the cross bars of the upper conveyer having openings and carrying a plurality of rows of die members coöperating with the said molds during the upper run of the mold conveyer to shape the dough into cone waffle form, means for driving one of said conveyers, notched heads projecting from the cross bars of the lower conveyer and adapted to be projected through the said openings of the bars of the upper conveyer, a spring-actuated latch bar carried by each cross bar of the upper conveyer and provided with latches to engage said notched heads and lock the bars together, and means to engage and trip each spring-actuated latch bar to permit the bars of the conveyers to be disconnected.

7. The combination of a cross bar provided with an opening, grooved extensions projecting from the cross bar at opposite sides of the opening and provided with inwardly projecting pins, a mold comprising a pair of sections and a pivot connecting said sections and engaging said grooved extensions, the mold sections having cam grooves engaged by said inwardly projecting pins, and springs for moving said pivot toward the outer ends of said sections to draw the mold through the opening and cause the pins to clamp the mold sections tightly together.

8. The combination of a cross bar provided with an opening, grooved extensions projecting from the cross bar at opposite sides of the opening and provided with inwardly projecting pins, a mold comprising a pair of sections and a pivot connecting said sections and engaging said grooved extensions, the mold sections having cam grooves engaged by said inwardly projecting pins, springs for moving said pivot toward the outer ends of said sections to draw the mold through the opening and cause the pins to clamp the mold sections tightly together, and means for overcoming the resistance of said springs to force the mold through the opening of the cross bar and the pins by engagement with the cam grooves, to hingedly spread the sections of the mold apart.

In testimony whereof, I affix my signature, in the presence of two witnesses.

HENRY HEMPEL.

Witnesses:
J. A. HOLT,
O. W. KINCADE.